(12) United States Patent
Huynh-Tran et al.

(10) Patent No.: US 7,265,173 B2
(45) Date of Patent: Sep. 4, 2007

(54) TIRE FABRIC COMPOSITIONS AND METHODS OF PRODUCTION THEREOF

(75) Inventors: Chi-T Huynh-Tran, Chesterfield, VA (US); Charles J. Nelson, Richmond, VA (US); Huy X. Nguyen, Midlothian, VA (US); Peter B. Rim, Midlothian, VA (US); Vinay Mehta, Chester, VA (US); Rita A. Feczer, Findlay, OH (US); Dennis A. Powell, Findlay, OH (US)

(73) Assignee: Performance Fibers, Inc., Richmond, VA (US)

( * ) Notice: Subject to any disclaimer, the term of this patent is extended or adjusted under 35 U.S.C. 154(b) by 0 days.

(21) Appl. No.: 10/342,533

(22) Filed: Jan. 14, 2003

(65) Prior Publication Data

US 2003/0166743 A1 Sep. 4, 2003

Related U.S. Application Data

(60) Provisional application No. 60/349,996, filed on Jan. 17, 2002.

(51) Int. Cl.
C08K 5/00 (2006.01)
C08K 5/34 (2006.01)
B60C 1/00 (2006.01)
B29C 65/00 (2006.01)

(52) U.S. Cl. .............. 524/284; 152/537; 152/564; 152/565; 524/100; 524/306; 156/60

(58) Field of Classification Search ............ 525/136, 525/139, 93; 428/292.1; 524/284, 525, 524/100, 306, 315; 156/60; 152/537, 564, 152/565
See application file for complete search history.

(56) References Cited

U.S. PATENT DOCUMENTS

| | | | | |
|---|---|---|---|---|
| 3,509,018 A | * | 4/1970 | Endter et al. .............. 428/494 |
| 3,638,703 A | | 2/1972 | Endter et al. .............. 152/330 |
| 3,738,948 A | * | 6/1973 | Dunnom .................... 523/514 |
| 3,778,406 A | | 12/1973 | Klotzer et al. ............. 260/41.5 |
| 4,348,517 A | | 9/1982 | Chakravarti ................ 523/425 |
| 4,462,855 A | | 7/1984 | Yankowsky et al. ...... 156/307.3 |
| 4,557,967 A | | 12/1985 | Willemsen et al. ......... 428/224 |
| 4,605,696 A | * | 8/1986 | Benko et al. ............... 524/432 |
| 4,818,601 A | * | 4/1989 | Itoh et al. ................. 428/296.4 |
| 4,889,891 A | | 12/1989 | Durairaj et al. ............ 525/139 |
| 4,892,908 A | * | 1/1990 | Durairaj et al. ............ 525/160 |
| 5,021,522 A | | 6/1991 | Durairaj et al. ............ 525/502 |
| 5,030,692 A | | 7/1991 | Durairaj .................... 525/134 |
| 5,049,618 A | * | 9/1991 | Wideman et al. ........... 525/136 |
| 5,049,641 A | | 9/1991 | Hood et al. ................ 528/155 |
| 5,075,415 A | | 12/1991 | Yotsumoto et al. ......... 528/149 |
| 5,206,289 A | | 4/1993 | Sinsky et al. .............. 525/109 |
| 5,244,725 A | | 9/1993 | Dressler et al. ............ 428/289 |
| 5,298,539 A | | 3/1994 | Singh et al. ................. 524/92 |
| 5,547,755 A | | 8/1996 | Reinthaler et al. .......... 428/364 |
| 5,656,687 A | * | 8/1997 | Segatta ..................... 524/525 |
| 5,684,082 A | * | 11/1997 | Segatta ..................... 524/525 |
| 5,684,802 A | | 11/1997 | Perreault et al. ............ 370/448 |
| 5,891,938 A | | 4/1999 | Williams ................... 524/100 |
| 5,922,797 A | | 7/1999 | Chu et al. .................. 524/346 |
| 5,936,056 A | | 8/1999 | Durairaj et al. ............ 528/96 |
| 5,945,500 A | | 8/1999 | Durairaj et al. ............ 528/96 |
| 6,444,322 B1 | | 9/2002 | Li et al. .................... 428/447 |

FOREIGN PATENT DOCUMENTS

| | | |
|---|---|---|
| DE | 19963304 | 6/2000 |
| GB | 1263915 | 2/1972 |
| JP | 6-294072 | 10/1994 |

OTHER PUBLICATIONS

J.P. Noe et al., "Rubber & Plastic News", May 14, 1978.
T.S. Solomon, "Rubber Chemistry & Technology", vol. 58, 561 (1985).
R. Iyengar, Rubber World, Nov. 1987, p. 24-29.

* cited by examiner

*Primary Examiner*—N. Edwards
(74) *Attorney, Agent, or Firm*—Fish & Associates, P.C.

(57) ABSTRACT

A polymer-based reinforced rubber composition may be produced that comprises a) a plurality of polymer-based fibers, wherein at least some of the plurality of polymer-based fibers comprises at least one surface modification agent; and b) a rubber compound, wherein the rubber compound comprises a plurality of active rubber moieties, and wherein at least some of the plurality of active rubber moieties is adhesively interactive with the surface modification agent. Methods of producing a polymer-based reinforced rubber composition comprise: a) providing a plurality of polymer-based fibers; b) providing a rubber compound or composition, wherein the rubber compound or composition comprises a plurality of active rubber moieties; c) coupling a surface modification agent onto the surface of at least some of the plurality of polymer-based fibers; and d) adhesively interacting the surface modification agent with at least some of the plurality of active rubber moieties in an adhesive interaction in order to produce an interface. Furthermore, the surface modification agent and the plurality of active rubber moieties are chosen, such that the plurality of active rubber moieties is adhesively interactive with the surface modification agent under preparation conditions, such as vulcanization.

22 Claims, No Drawings

TIRE FABRIC COMPOSITIONS AND METHODS OF PRODUCTION THEREOF

This application claims priority to U.S. Provisional Application Ser. No.: 60/349,996 filed on Jan. 17, 2002, which is incorporated herein by reference. This application is also related to a PCT Application having the same title filed in the US Receiving Office and designating the European Patent Office as the Searching Authority filed on Jan. 15, 2003 (serial number not yet assigned), which is incorporated herein by reference.

FIELD OF THE INVENTION

The field of the invention is tire cord/rubber compositions and more specifically, the coupling of surface-modified polymer-based tire cords, including polyester-based tire cords, to rubber and the related compositions and items formed from the disclosed methods.

BACKGROUND

Tires generally comprise a composite of rubber compositions with fiber reinforcements. In some instances, the fiber reinforcements are based on synthetic polymers, such as polyester. Polyester fibers have been widely used as a reinforcing material for rubber in tires. However, achieving good adhesion of polyester tire cords to rubber compounds has always been a challenge, primarily due to the high molecular weight, high degree of crystallinity and highly drawn characteristics of the final polyester fibers which leave only few free hydroxyl and carboxyl groups on the surface of the fibers. With a limited number of functional groups remaining on the fiber surface, the reactivity of the polyester fiber surface towards adhesive agents is therefore, very limited.

In the tire industry, two conventional adhesive systems are widely used for achieving good bonding between tire cords and rubber compounds: 1) the Resorcinol-Formaldehyde-Latex (RFL) method wherein an adhesive is applied to the tire cord and 2) the Hexamethylenetetramine-Resorcinol (HR) method wherein an adhesion promotion system is incorporated into the rubber compound. For greater adhesion effectiveness, HR systems often contain hydrated silica and, in that case, they are referred to as HRH systems. Detailed discussions of the conventional RFL and HR methods that are being widely used in the industry can be found in several comprehensive reviews, including J. P. Noe et. al., Rubber and Plastic News, 14, May 1978; T. S. Solomon, Rubber Chemistry and Technology, vol. 58, 561 (1985); and R. Iyengar, Rubber World, November 1987, p. 24–29. Extensive literature has dealt with achieving the desired adhesion levels for polyester/rubber composites; however, most approaches are directed towards the modifications of the RFL dips and/or the HR rubber systems to improve adhesion. In order to understand how each of these adhesive methods works, it is important to understand the basic process of forming tires and tire fabric.

In conventional tire fabric processes, yarn is shipped to a conversion mill where it is subject to the following process: a) yarn is twisted into a greige cord (an unfinished cord), b) the greige cords are generally woven into a unidirectional fabric stabilized with fine denier "pick threads" in the weft direction, c) an aqueous dip (commonly known as a resorcinol-formaldehyde-latex (RFL) adhesive system) is applied to the greige cord, d) the dipped cord is dried, and e) the dried cord is subjected to high energy treating step, often requiring relatively high temperatures (350–480° F.) for relatively long residence times (30–120 sec). The resulting treated cord is then shipped to a tire plant where it is formed (generally calendered or passed between heated steel rolls) into a cord reinforced rubber sheet which is ultimately built into tires. These steps are generally performed at a conversion mill whose location is separate from either the yarn production or the tire production sites. These separate production locations are necessary because the treating units tend to be high-volume, multi-story units capable of making fabric over 50 inches wide.

Typical tire "fabric" has at least 20–30 cords per inch, which adds up to over 1000 cord ends that are simultaneously treated. In instances where single-end cords are required, 100–200 greige cords are generally placed in a creel, then the individual cord ends are fed directly into a treating unit, and finally the treated cords are wound onto individual spools. Compared to conventional fabric treating operations, these single-end treating operations are very inefficient and hence much more costly.

When using the RFL method to treat tire cords, the cords are coated with an aqueous solution consisting of a mixture of a resorcinol-formaldehyde resin and typically a latex of a styrene-butadiene-vinyl pyridine terpolymer. The coating process is typically followed by high temperature heat treatment for drying and crosslinking the resin to form a strong network, which is necessary to achieve optimum adhesion to rubber. Due to the low polarity of the polyester fiber surface as discussed above, numerous modifications of the RFL method have been successfully developed and widely used in the industry to achieve good adhesion between polyester fibers and rubber compounds. These include: (1) applying an adhesive activated spin finish or overfinish onto the polyester fiber surface during the fiber spinning process prior to RFL treatment; (2) utilizing a two-step coating process where the greige cords are pre-coated with for example, a blocked isocyanate/polyepoxide mixture prior to the RFL coating; or (3) using a one-step coating process where the RFL coating is further activated with other adhesive systems. Typical adhesion active finishes are described in U.S. Pat. Nos. 4,348,517; 4,462,855; 4,557,967; and 5,547,755.

For example, U.S. Pat. No. 5,075,415 describes an adhesive composition that strongly bonds polyester fibers to rubbers with reduced adhesive deterioration at elevated temperatures. The one-step dip consists of adding a co-condensation resin derived from m-cresol, m-aminophenol and formaldehyde to the standard RFL mixture. U.S. Pat. No. 5,922,797 describes an RFL adhesive system where the adhesion was improved further through the incorporation of a fourth monomer in the latex polymer. More specifically, the adhesion of the epoxy surface activated polyester fibers to rubber was improved with an RFL coating containing a latex polymer derived from styrene, butadiene, vinyl pyridine and vinyl aldehyde monomer. U.S. Pat. No. 6,444,322 describes an adhesive composition for a textile-reinforced rubber product where the polyester or polyamide reinforcing fibers were pre-coated with a mixture of amine functional silanes and organosilanes with unsaturation capable of reacting with the rubber, followed by a standard RFL treatment.

With respect to the RFL method, it can be seen in the above-discussed literature, that the most common solutions for improving polyester tire cords to rubber adhesion involved combinations of the following systems: (a) surface treatment of polyester fibers with epoxy based finishes, (b) pre-coating the fiber with a blocked isocyanate/epoxy resin mixture prior to RFL treatment, and (c) mixing resorcinolformaldehyde-latex coatings with other adhesion promoters. Most of these processes are followed by high energy treatments which are required to dry the latex dip, to pre-react the dried latex components and crosslink the RFL adhesive coating. Thus, both long time (>30 sec) and high temperature are usually needed.

The second method for achieving adhesion between tire cords and rubber is the HR method and, particularly the improved HRH version. As mentioned earlier, the term "HRH" refers to the three adhesive components that are typically compounded into the rubber: 1) hexamethylenetetramine or hexamethoxymethylmelamine (commonly referred to as formaldehyde or methylene donor), 2) resorcinol (or any other phenolic derivatives, commonly referred to as formaldehyde or methylene acceptor) and 3) hydrated silica. This method has potential as a direct bonding or dry rubber method. In this case, the tire cords are embedded directly into the rubber. The crosslinked resin resulting from the reaction between the methylene donor and methylene acceptor is formed in-situ during the rubber vulcanization process. The RFL coating step can be totally omitted. This method was originally developed for metal wires since these cannot be pretreated with an RFL system. The method was later successfully adapted to work with polyamide fibers due to its inherent high degree of polarity. This method has not yielded good adhesion to polyester cords.

HR modified stocks have been used to improve adhesion to polyester treated cords. U.S. Pat. No. 3,638,703 describes the use of different acids to complex with hexamethylenetetramine in the HR modified rubber system to prevent the strength loss via degradation of polyester fiber during rubber curing which is due to ammonia generated from the decomposition of hexamethylenetetramine. This reference mentions the use of greige PET fabric in rubber and the improvement in bonding PET to rubber when HR is present in the rubber. However, it does not (a) mention the importance of the activation of the PET or (b) provide any information regarding the ability to achieve the adhesion level necessary for use in tires. Instead it merely says that adhesion may be improved by using conventional cord adhesives. U.S. Pat. No. 3,738,948 teaches the use of metal soaps such as calcium stearate in HRH modified rubber stocks to prevent the degradation of polyester cords and consequently preserving fiber to rubber adhesion. U.S. Pat. No. 3,778,406 teaches a process of premixing finely divided silica with resorcinol as a method for improving adhesion of conventional polyester fiber to HRH modified rubbers. Incorporation of lead oxide was also found to improve adhesion further. It should be noted from this reference that the modified HRH rubber works well, provides good adhesion with greige Nylon fibers, but not with greige ("non-impregnated") polyester fibers. U.S. Pat. Nos. 5,656,687 and 5,684,082 disclosed improved adhesion of polyamide, polyester and metal tire cords by incorporating in addition to methylene donor, methylene acceptor and silica, a maleated styrene-butylene-styrene triblock polymer. JP 06294072 (1994) describes a rubber reinforcing fiber material where the surface of the fiber is treated with a reactive blocked isocyanate-based polyurethane which can deblock at rubber cure temperature to generate isocyanate groups which can subsequently react with the adhesive components in the HRH modified rubber. However, the use of blocked isocyanate is not safe and not environmentally desirable. British Patent 1263915 describes a rubber cement compound for use in the production of reinforced rubber articles such as V-belts. The adhesion pretreated polyester yarn (DIOLEN™ 164S) was coated with a rubber cement prepared by mixing neoprene, fillers, oil, curing agents, resorcinol supported on silica and hexamethylenetetramine in toluene solution followed by drying.

In most instances, conventional processes that involve HR modified rubber compositions have problems with the generation of fumes associated with the use of pure resorcinol. The use of pure resorcinol also results in hydroscopicity. There have been many attempts to modify resorcinol to reduce this fuming and hydroscopicity. U.S. Pat. No. 4,889,891 discloses that resorcinolic resins derived from reactions of resorcinol with mono or polyunsaturated hydrocarbon compounds such as piperylene, dipentene, dicyclopentadiene or divinylbenzene can reduce fuming associated with pure resorcinol and improve rubber adhesion. U.S. Pat. No. 4,892,908 described benzoylresorcinol as an alternative replacement for resorcinol. U.S. Pat. No. 5,049,641 replaced resorcinol with styrene modified resorcinol-formaldehyde resin. U.S. Pat. Nos. 5,936,056 and 5,945,500 replaced resorcinol with resorcinolic or phenolic resins modified with epoxy resin, styrene or aromatic phenolic compounds. U.S. Pat. No. 5,206,289 taught a novel rubber stock composition modified with polyhydric phenoxy resin with improved cured rubber tensile strength at break. In most of these patents however, there was no mention of the type of fiber used and little to no adhesion data was reported in the examples.

Several patents that dealt with the problems inherent to the use of pure resorcinol also disclosed certain adhesive improvements in the materials. For example, U.S. Pat. No. 5,030,692 taught improving adhesion and mechanical properties of copper wire with resorcinolic novolac resins modified with cashew nut liquid or allyl and alkyl phenol. U.S. Pat. No. 5,021,522 disclosed the use of phenolic novolac resin modified with styrenic compounds to reduce fuming and hydroscopicity associated with pure resorcinol and to improve adhesion of copper wire. U.S. Pat. No. 5,244,725 disclosed the incorporation of hydroxyalkyl aryl ethers of di- and polyhydric phenols into HR modified rubber to improve adhesion of copper wire. U.S. Pat. No. 4,605,696 taught the use of phenolic esters such as resorcinol benzoate, resorcinol rosinate as a replacement for resorcinol in the HR rubber formulations to enhance adhesion of textile fibers or wire cords to rubber. U.S. Pat. No. 5,049,618 taught vulcanizable rubber compositions containing hydroxyl-aryl substituted monomaleimide as an alternative to resorcinol to increase adhesion of nylon and improve tear resistance of the resulting cured rubber stock. Although adhesion data was reported in these patents, the data dealt primarily with nylon cords and copper wires.

In a continuing effort to improve adhesion properties in rubber compositions for the tire industry, several patents describe using self-crosslinkable additives and other additives in the place of resorcinol. For example, U.S. Pat. No. 5,298,539 disclosed rubber compositions with improved tire cord adhesion using new self-crosslinkable additives. The additives include derivatives of melamine, aceto guanamine, benzoguanamine substituted with vinyl terminated radicals. U.S. Pat. No. 5,891,938 described the use of self-condensing high imino alkylated triazine resins for improved tire cord adhesion and reinforcement without the need for resorcinol or methylene acceptor. Only rheological cured properties of modified rubber stocks were provided.

With respect to the HR method, prior developments were focused on the combination of both the methylene donor and methylene acceptor in the rubber stock. One of the disadvantages of having both the methylene donor and methylene acceptor in the rubber is that they form a highly crosslinked resin during rubber curing, which increases the hardness of the final cured rubber and consequently leading to poor dynamic adhesion and fatigue resistance of the final reinforced rubber components.

Therefore, there is still a need in the tire manufacturing industry for a composition that has good dynamic adhesion, while ensuring that the final cured rubber composition is pliable and has good fatigue resistance. It is also important to ensure that the process, intermediate and final compositions are environmentally friendlier and safer than previously developed compositions and processes. Furthermore, there is still a need to provide methods for achieving improved adhesion between polyester cords and rubber over conventional methods previously mentioned and that can a) eliminate the use of an RFL coating, b) avoid the high temperature heat treatment required to cure the RFL adhesive resin prior to rubber curing, and/or c) reduce the hardness problem associated with the crosslinking of the bonding agents present in the HRH modified rubber stock.

SUMMARY OF THE SUBJECT MATTER

The subject matter herein is directed to a polyester-based reinforced rubber composition comprising a plurality of polyester-based fibers, wherein the plurality of polyester-based fibers comprises a surface modification agent; and a rubber compound, wherein the rubber compound comprises a plurality of active rubber moieties, wherein the plurality of active rubber moieties is adhesively interactive with the surface modification agent.

The subject matter herein is further directed to a method of producing a polyester-based reinforced rubber composition, comprising providing a plurality of polyester-based fibers; providing a rubber compound or composition, wherein the rubber compound or composition comprises a plurality of active rubber moieties; coupling a surface modification agent onto at least some of the plurality of polyester-based fibers; and interacting the surface modification agent with at least some of the plurality of active rubber moieties in an adhesive interaction in order to produce an interface.

DETAILED DESCRIPTION

The subject matter described herein provides methods for eliminating the separate high energy treating step, which, in turn, is the primary driver for large, centralized cord conversion mills. More specifically, compositions and processes are provided herein for streamlining and integrating the "dipping" and treating process into other process steps and, in some instances, for actually eliminating those two process steps. In addition, the subject matter described herein improves adhesion between the plurality of polymer-based fibers and the rubber composition or compound through the addition of adhesion chemistries to both the polymer-based fibers and the rubber composition or compound, which is believed to be significantly different than any previously mentioned conventional adhesive methods that concentrate on adding adhesion promoting moieties to either the fiber or the rubber. The resulting products and compositions may be used in tire and mechanical rubber goods (MRG) applications. This technology is particularly well-suited for new tire processes which require single-end cords or reinforced rubber strips.

According to the subject matter described herein, the surface of polymer-based, such as polyester-based fibers, may be engineered and modified such that increased adhesion to rubber compounds can be achieved, even and surprisingly when a high-energy treating step is not used. In this regard, a polymer-based reinforced rubber composition may be produced that comprises a) a plurality of polymer-based fibers, wherein at least some of the plurality of polymer-based fibers comprises at least one surface modification agent; and b) a rubber compound, wherein the rubber compound comprises a plurality of active rubber moieties, and wherein at least some of the plurality of active rubber moieties is adhesively interactive with the surface modification agent. The adhesive active chemistries on the surface of the polymer-based fiber or cord that lead to this increased adhesion will be referred to as a "surface modification agent" and are substantially free of rubbers having a number average molecular weight of greater than about 20,000. The adhesive active chemistries in the rubber are herein referred to as "active rubber moieties" (ARM).

A plurality of polymer-based fibers, which would normally be used to make tire fabric and related compositions and materials, may be used herein as a starting point. The polymer-based fibers generally comprise any long chain natural or synthetic polymer composed of at least about 80% by weight of an ester of a dihydric alcohol and terephthalic acid (PET) or naphthalene dicarboxyllic acid (PEN). For example, a suitable and contemplated polymer-based fiber comprises polyester, polyester-based materials and/or materials that include, in part, polyester compounds.

At this point it should be understood that, unless otherwise indicated, all numbers expressing quantities of ingredients, constituents, interaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Not with standing that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

In contemplated embodiments, the surfaces of the plurality of polymer-based fibers can be modified and/or engineered with a surface modification agent containing at least one adhesive group. It is contemplated that many adhesive groups may be utilized, so long as contemplated adhesive groups are able to adhesively interact with one another. In an example, a first adhesive group may comprise an electrophile, while a second adhesive group may comprise a nucleophile. It is further contemplated that the number of adhesive groups predominantly depends on (a) the interactivity of the first and second adhesive group, (b) the strength of the adhesive interaction between the surface of the polymer-based fiber and the active moieties in the rubber composition, and (c) the desired degree of adhesive bonding and/or crosslinking at the resin interface. For example, when the first and second adhesive groups are sterically hindered, a relatively high number of adhesive groups may be needed to interact with the surface of the polymer-based fiber and the active moieties in the rubber composition to a certain extent. Likewise, a high number of adhesive groups may be required to achieve stable adhesive interaction when relatively weak bonds such as hydrogen bonds or ionic bonds are formed between the adhesive groups.

As used herein, the term "adhesive group" refers to any atom, functionality, or group having sufficient adhesive interactivity to form at least one interface with another adhesive group in an adhesive interaction. As used herein, the term "interface" means a couple or bond that forms the common boundary between two parts of matter or space, such as between two molecules, two backbones, a backbone and a network, two networks, etc. An interface may comprise a physical attachment of two parts of matter or components or a physical attraction between two parts of matter or components, including bond forces such as covalent and ionic bonding, and non-bond forces such as Van der Waals, electrostatic, coulombic, hydrogen bonding and/or magnetic attraction. Contemplated interfaces include those interfaces that are formed with bond forces, such as covalent bonds; however, it should be understood that any suitable adhesive attraction or attachment between the two parts of matter or components is preferred.

The number of adhesive groups may influence the ratio of intermolecular to intramolecular adhesive or chemical interactions. For example, a relatively high concentration of adhesive groups in first and second backbones at a relatively low concentration of both backbones may favor intramolecular reactions. Similarly, a relatively low concentration of adhesive groups in first and second backbones at a relatively high concentration of both backbones may favor intermolecular reactions. The balance between intra- and intermolecular interactions may also be influenced by the distribution of non-identical adhesive groups between the backbones. When an intermolecular interaction is desired, one type of adhesive group may be placed on the first backbone, while another type of adhesive group may be positioned on the second backbone. Furthermore, additional third and fourth adhesive groups may be utilized when sequential interactions or crosslinking at different conditions is desired (e.g. two different temperatures).

The adhesive groups of contemplated adhesive interactions, however, depending on the chemical nature of alternative adhesive groups, may result in many other interactions, including nucleophilic and electrophilic substitutions, or eliminations, radical reactions, etc. Further alternative interactions may also include the formation of non-covalent bonds, such as electro-static bonds, hydrophobic bonds, ionic bonds and hydrogen bonds.

As used herein, the term "crosslinking" refers to a process in which at least two molecules, or two portions of a long molecule, are joined together by a chemical and/or adhesive interaction. Such interactions may occur in many different ways including formation of a covalent bond, formation of hydrogen bonds, hydrophobic, hydrophilic, ionic or electrostatic interaction. Furthermore, molecular interaction may also be characterized by an at least temporary physical connection between a molecule and itself or between two or more molecules.

The adhesive interaction may take place between two identical, or non-identical reactive groups, which may be located on the same or on two separate backbones and/or the same or two separate networks. As used herein, the term "backbone" means a contiguous chain of atoms or moieties forming a polymeric strand that are covalently bonded such that removal of any of the atoms or moieties would result in interruption of the chain. As used herein, the term "network" means the structure that results from the interaction, whether that interaction is chemical or adhesive, of at least one backbone, such as that structure that would result from crosslinking one backbone with a second backbone, or one backbone with itself.

Exogenous molecules may also be used to attach the molecule, backbones and/or networks. As used herein, the phrase "exogenous molecules" means those molecules that are added to induce or improve the adhesive or chemical reaction between molecules, backbones and/or networks that would not have otherwise reacted in this manner. Although reactions without exogenous molecules presents various advantages, including reducing the overall number of adhesive groups or reactive groups in the polymer, and reducing the number of required reaction steps, reactions without exogenous molecules also has a few detriments. On the other hand, employing exogenous molecules may be advantageous when the polymerization reaction and/or adhesive reaction are chemically or adhesively incompatible.

At least one of the following functionalities and/or adhesive groups may be utilized as a surface modification agent: glycidyl ether, phenolic, resorcinolic, disulfide, tetrasulfide, alkoxy, methylol, unsaturated groups and/or aromatic hydroxy compounds and/or any other aromatic hydroxyl compounds. Additionally, an adhesion promoting additive, such as nylon, may be incorporated into the polyester fiber. The surface-modified polymer-based fibers adhesively interact, during rubber vulcanization, with the at least one active rubber moieties in the rubber composition to form a rubber/fiber interface. In some instances, the interface may comprise a resin. The active rubber moieties that are incorporated into contemplated rubber stocks may be methylene donor, methylene acceptor components and mixtures thereof, depending on the nature of the polymer-based fibers and the surface modification agents being utilized. If the methylene donor is present in the rubber, then the methylene acceptor is deposited on the surface of the polymer-based fiber and/or vice versa. Placing either the methylene acceptor or donor on the fiber allows one to adjust the rubber composition for better combination of properties and economics. The methylene donor and/or methylene acceptor may be added at amounts of about 0.1 to about 10 parts relative to the uncured rubber. Silica may also be added at about 0.1 to about 20 parts relative to the uncured rubber.

The surface modification agent may also comprise one or more of the following chemical functionalities such as epoxy, resorcinol, phenolic, alkoxy, sulfide, amine, unsaturated double bonds, nylon and/or groups that are capable of (a) co-curing during the rubber curing process to form an interpenetrating network at the interface between the fiber and the rubber composition and/or (b) adhesively interacting with the active rubber moieties in the rubber compound or rubber composition. The surface modification agent may be added at about 0.1 to about 10 parts per weight relative to the fiber weight.

Compounds with phenolic or resorcinolic groups comprise compounds based on di- or poly-hydric phenol, di- or poly-hydric phenolic novolac resin and alkyl or aryl substituted derivatives thereof. Examples of these compounds are described in the following U.S. Patents: U.S. Pat. No. 4,605,696 (1986), U.S. Pat. No. 4,889,891 (1989), U.S. Pat. No. 4,892,908 (1990), U.S. Pat. No. 5,021,522 (1991), U.S. Pat. No. 5,030,692 (1991), U.S. Pat. No. 5,049,641 (1991), U.S. Pat. No. 5,049,618 (1991), U.S. Pat. No. 5,206,289 (1993), U.S. Pat. No. 5,244,725 (1993), U.S. Pat. No. 5,945,500 (1999). Specific examples of these compounds include resorcinol, resorcinol-formaldehyde resin, keto or monoester resorcinol derivatives such as benzoyl resorcinol, resorcinol monobenzoate, resorcinol monorosinate, alkyl and/or aryl substituted phenolic and resorcinolic novolac resins, alkanoyl groups, aroyl groups, halogen substituted compounds, polyhydric phenoxy resin, hydroxyl-aryl substituted monomaleimide, hydroxyalkyl aryl ethers of di and polyhydric phenols, styrene modified phenolic or resorcinolic resin, bisphenol-A epoxy resin-modified resorcinolic or phenolic resins, resorcinolic novolac resins modified with cashew nut liquid or allyl and alkyl phenol, resorcinolic resins derived from resorcinol and mono or polyunsaturated hydrocarbon compounds such as piperylene, dipentene, dicyclopentadiene, divinylbenzene, sulfur containing phenolic or resorcinolic resin derivatives or mixture or derivatives of any of the foregoing.

Examples of compounds containing surface modification agents, such as alkoxy groups, that can optionally be deposited onto the polymer-based fiber surface comprise hexamethoxymethylmelamine, partially or completely esterified or etherified melamine-formaldehyde resins or any N-substituted oxymethyl melamines, monomeric or oligomeric derivatives of melamine, benzoguanamine, acetoguanamine, cyclohexylguanamine, and glycoluril, any self-condensing derivatives of triazine resins and their oligomers, or mixtures or derivatives of any of the foregoing.

Examples of compounds that can be used to deposit surface modification agents, such as unsaturated double bonds onto the surface of the polymer-based fibers comprise vinyl-functionalized organosilanes and/or any rubber having a number average molecular weight of less than about 20,000, preferably liquid rubber for ease of coating, including liquid polybutadiene, polyisoprene, epoxy or anhydride functionalized polybutadiene, epoxy or functionalized polyisoprene and functionalized styrene-butadiene copolymers. Examples of compounds providing surface modification agents, such as disulfide or tetrasulfide linkages, on the polymer-based fiber surface may also comprise bis(triethoxysilylpropyl) disulfide or bis(triethoxysilylpropyl)tetrasulfide.

The term "alkyl" is used herein to mean a branched or a straight-chain saturated hydrocarbon group or substituent of 1 to 100 carbon atoms, such as methyl, ethyl, n-propyl, isopropyl, n-butyl, isobutyl, t-butyl, octyl, decyl, tetradecyl, hexadecyl and the like. In some embodiments, contemplated alkyl groups contain 1 to 24 carbon atoms. The term "cyclic alkyl" means an alkyl compound whose structure is characterized by one or more closed rings. The cyclic alkyl may be mono-, bi-, tri- or polycyclic depending on the number of rings present in the compound.

The term "aryl" is used herein to mean a monocyclic aromatic species of 5 to 7 carbon atoms or a compound that is built with monocyclic aromatic species of 5 to 7 carbon atoms and is typically phenyl, naphthalyl, phenanthryl, anthracyl etc. Optionally, these groups are substituted with one to four, more preferably one to two alkyl, alkoxy, hydroxy, and/or nitro substituents. The term "alkenyl" is used herein to mean a branched or a straight-chain hydrocarbon chain containing from 2 to 24 carbon atoms and at least one double bond. Preferred alkenyl groups herein contain 1 to 12 carbon atoms. The term "alkoxy" is used herein to mean an alkyl group bound through a single, terminal ether linkage; that is, an alkoxy group may be defined as —OR wherein R is an alkyl group, as defined above.

Rubber compositions or compounds utilized herein can be saturated, unsaturated or a combination thereof, as long as the rubber compositions and compounds are suitable for use in tire fabrics and related materials. In contemplated embodiments, the rubber compositions or compounds comprise at least some degree of unsaturation. Contemplated rubber compounds described herein are comprised of mixtures containing various natural and synthetic rubbers including but not limited to, polyisoprene, acrylonitrile-butadiene copolymers, polychloroprene, butyl rubber, ethylene-propylene-diene (EPDM) terpolymers, polybutadiene (which can be modified by hydroxyl groups, carboxylic acid groups and/or anhydride groups), styrene-butadiene copolymers compounded with silica, sulfur, rubber curing initiators, accelerators, oils, antidegradants and other reinforcing fillers.

In other contemplated embodiments, surface modification agents were applied to the plurality of polymer-based fibers, such as polyester-based fibers, which were modified by incorporating nylon into the polymer melt prior to or during the spinning process. Surface modification with epoxy groups was obtained through a spin finish or an overfinish containing conventional epoxy compounds with glycidyl ether linkages.

Methods of producing a polymer-based reinforced rubber composition comprise: a) providing a plurality of polymer-based fibers; b) providing a rubber compound or composition, wherein the rubber compound or composition comprises a plurality of active rubber moieties; c) coupling a surface modification agent onto the surface of at least some of the plurality of polymer-based fibers; and d) adhesively interacting the surface modification agent with at least some of the plurality of active rubber moieties in an adhesive interaction in order to produce a well-adhered interface.

Furthermore, the surface modification agent and the plurality of active rubber moieties are chosen, such that the plurality of active rubber moieties is adhesively interactive with the surface modification agent under preparation conditions, such as vulcanization. In other words, before the coupling step between the surface modification agent and the at least some of the plurality of polymer-based fibers, there will be a choosing step or recognition step wherein the surface modification agent is chosen or recognized to be adhesively compatible with the plurality of active rubber moieties. It should further be understood that the term "compatible" is relative to the interface desired. If the interface desired is to be highly crosslinked, then the surface modification agent will need to be chosen accordingly.

In addition, a polyester-based reinforced rubber composition may also be produced that comprises: a) a plurality of polyester-based fibers, wherein the plurality of polyester-based fibers comprises a surface modification agent; and b) a rubber compound, wherein the rubber compound comprises a plurality of active rubber moieties, wherein the plurality of active rubber moieties is adhesively reactive with the surface modification agent and wherein the rubber compound consists essentially of non-metal moieties.

A plurality of polymer-based fibers may be provided by any suitable method, including a) buying polymer-based fibers from a supplier or textile mill; b) preparing or producing the polymer-based fiber in house using chemicals provided by another source and/or c) preparing or producing the polymer-based fiber in house using chemicals also produced or provided in house or at the location. It is contemplated that polymer-based fibers are made of any suitable material, such as those materials already described herein.

The fiber surface may be modified by finishes or coatings applied during (a) the yarn making step (i.e., during spinning and/or drawing), (b) subsequent yarn handling (i.e., package formation, beaming, re-winding, etc.), (c) ply or cable twisting, and/or (d) cord coating operations prior to calendering, extrusion, or even filament-winding. The finishes or coatings may aqueous, non-aqueous solvent-based, or "neat"—meaning that there is no solvent or other molecule and/or compound present that must be removed during later processing. Aqueous emulsions may be applied anywhere in the process, but it is preferred to apply them during spinning and drawing where the applied heat will quickly drive-off the water or prior to a storage step where there is time for the water to evaporate. "Neat" coatings may be applied to the yarn or the resulting cord. It is preferred that these neat coatings are fluid at elevated temperature to facilitate uniform coating and then solidify upon cooling to facilitate handling and packaging.

Contemplated non-aqueous solvents include any suitable pure or mixture of organic molecules that are volatilized at a desired temperature and/or easily formed into an organic phase. The solvent may also comprise any suitable pure or mixture of polar and non-polar compounds. Some solvents include, but are not limited to, ketone-based solvents, such as acetone, methyl ethyl ketone and 2-propanol.

Rubber compounds or rubber compositions that comprise a plurality of active rubber moieties may be provided by any suitable method, including a) buying rubber compounds or rubber compositions from a supplier; b) preparing or producing the rubber compounds or rubber compositions in-house using chemicals provided by another source and/or c) preparing or producing the rubber compositions or rubber compounds in house using chemicals also produced or provided in house or at the location. It is contemplated that the rubber compounds or rubber compositions are made of any suitable material, such as those materials already described herein. It is further contemplated that the active rubber moieties may already be present in the rubber compound or rubber composition or the active rubber moieties may be selected, tailored and added to the rubber compound or rubber composition once the surface modification agent is selected. It is contemplated that the amount of active rubber moities in the uncured rubber is about 0.1 to about 10 parts per hundred relative to the uncured rubber.

The surface modification agent, such as those already described herein is then coupled with at least some or all of the plurality of polymer-based fibers. In contemplated embodiments, the compound or composition that will provide the surface modification agent is blended or solvated with an appropriate solvent and then coated onto at least some of or all of the plurality of polymer-based fibers. The coating process may comprise dipping the plurality of polymer-based fibers into the solvated mixture comprising the surface modification agent, pouring the solvated mixture onto at least some of or all of the plurality of polymer-based fibers, spraying the solvated mixture onto at least some of or all of the plurality of polymer-based fibers and/or combinations thereof. It is further contemplated that the compounds and/or compositions that comprise the surface modification agent may be vaporized and applied to the plurality of the polymer-based fibers by a vapor deposition process. However the surface modification agent is coupled to the plurality of polymer-based fibers, it should be understood that the product will be capable of adhesively interacting with the active rubber moieties in the rubber composition or rubber compound under the appropriate conditions.

As mentioned earlier, the surface modification agent and at least some of the plurality of active rubber moieties are selected, tailored and/or designed in order to bring about an adhesive interaction between the two under controlled preparation conditions, such as a vulcanization process. In contemplated embodiments, the adhesive interaction that takes place will be a crosslinking reaction between the surface modification agent and at least some of or more preferably, all of the plurality of active rubber moieties. It should be understood that ideally all of the plurality of active rubber moieties will adhesively interact with the surface modification agent to improve the adhesion between the polymer-based fibers and the rubber composition over that of previously-cited conventional art; however, it is more realistic to expect that, because of steric and physical hindrance, at least some of the plurality of active rubber moieties will adhesively interact with the surface modification agent.

It is preferred that the adhesive components including the methylene donor and methylene acceptor are separated from each other and will undergo an adhesive interaction only during rubber curing. More specifically, if the methylene acceptor is deposited onto the surface of polymer-based fibers, then the methylene donor is incorporated into the rubber compounds, or vice versa. In other words, the surface modification agent comprises one of either a methylene donor or a methylene acceptor and the active rubber moieties comprise one of either a methylene donor or a methylene acceptor, such that neither the surface modification agent nor the active rubber moieties comprise both the methylene donor and the methylene acceptor. It is believed, without being bound by this theory, that this separation of bonding agents yields an adhesive interaction at or near the rubber/fiber interface and hence the final cured rubber will not be as hard as when both of the methylene donor and methylene acceptor are present in the same rubber formulation. It further is believed that this separation of the methylene donor and acceptor minimizes the quantity of adhesive components needed to achieve adhesion, which is more economically desirable.

EXAMPLES

The cord construction, rubber compounds, selection of methylene donor or methylene acceptor and rubber vulcanization conditions, as described in the examples are for illustrative purpose only and should not, in any way, limit the scope of this invention.

Cord Construction

All polyester cords used in this invention have a two-ply construction and were prepared from 1000 denier yarns twisted to 9.5×9.5 turns per inch.

Adhesion Testing

The cords to be tested were first wound on a winding drum (6.5 inches in diameter) that was wrapped with a 20-mils thick strip of test rubber to form a pad of 6 inches in width with an average of about 36–40 ends per inch. The cord/rubber pad was removed from the drum, laid flat on a workbench with the exposed cord side facing up. A strip of backing rubber was then placed on the top of the cord surface to form the complete test pad. Two 6 inches by 8 inches sections were cut from the test pad and strips of separator cloth (1 inch in width) were placed at each end of the sections. One section was placed on the top of the other with the test rubber layers facing each other.

The cord/rubber test pads as prepared were then cured at 350° F. for 8 minutes in a hot press under a pressure of 333 psi. All cured test pads were left to condition for a minimum of 16 hours at 75° F. prior to testing. Cured test strip samples (1 inch by 4 inches) were cut from the cured pad in the direction parallel to the cord lay-down direction, and tested for Hot Peel Adhesion. The hot peel test was carried out using an Instron Tensile tester at a pull rate of 4 inches per minute. The test strips were conditioned in an oven at 250° F. for 30 minutes and pulled apart immediately after removing from the oven.

The maximum force required to pull the test coupon apart was reported as the peel strength in lbs/in (pounds per inch). Visual rating (grade) was determined according to the percentage of rubber still observable on the cord surface after the two parts of the rubber strips have been pulled apart. A "0 rating" corresponds to no rubber coverage or adhesive failure at the rubber/cord interface and a "5 rating" means that there is 100% rubber coverage indicating a cohesive failure of the rubber.

Compositions of Rubbers

The compositions of the rubber compounds used in the examples are shown in Tables 1 and 2. The amount of each component is listed in the table as parts by weight. The first rubber formulation (designated as Control Rubber in Table 1) contains no adhesive or active rubber moieties. This is a rubber formulation that is typically used with the conventional RFL treated cords. The modified rubber compounds (designated as HRH-1 and HRH-2 in Table 1) are derived from the same formulation as the control rubber but contain different levels of methylene donor and methylene acceptor. In this invention, for illustrative purpose, the methylene acceptor that is being used is a compound available from PolyOne Corporation as Redimix 401RAP60. It is a resorcinol/stearic acid blend containing 60 percent active resorcinol. The methylene donor used in this invention was obtained from Solutia Inc. as Resimene 3520 S72. It is a methylated melamine resin supported on calcium silicate and is 72 percent active.

TABLE 1

Rubber Compositions used in Comparative Examples and Examples 1–4

| (All components are listed in parts parts by weight) | Control Rubber | Modified Rubber HRH-1 | Modified Rubber HRH-2 |
|---|---|---|---|
| Natural rubber | 64.3 | 64.3 | 64.3 |
| Styrene-Butadiene rubber | 14.7 | 14.7 | 14.7 |
| Polybutadiene rubber | 21.0 | 21.0 | 21.0 |
| Zinc Oxide | 3.4 | 3.4 | 3.4 |
| Stearic acid | 1.9 | 1.9 | 1.9 |
| Polymerized 1,2-dihydroxy-2,2,4-trimethylquinoline | 1.0 | 1.0 | 1.0 |
| Petroleum hydrocarbon resin | 2.9 | 2.9 | 2.9 |
| Carbon black | 48.0 | 33.6 | 33.6 |
| Oil | 11.2 | 11.2 | 11.2 |
| N-t-butylbenzothiazole sulfonamide | 0.8 | 0.8 | 0.8 |
| Morpholinobenzothiazole | 0.6 | 0.6 | 0.6 |
| Sulfur | 2.8 | 2.8 | 2.8 |
| Methylene Acceptor (Resorcinol based compound) | 0 | 2.4 | 1.5 |
| Methylene Donor (Hexamethoxymethylmelamine resin based compound) | 0 | 1.5 | 2.4 |
| Silica | 0 | 14.4 | 14.4 |

TABLE 2

Rubber Compositions used in Examples 5–6

| (All components are listed in parts by weight) | R-1 | R-2 | R-3 | R-4 | R-5 |
|---|---|---|---|---|---|
| Natural rubber | 64.3 | 64.3 | 64.3 | 64.3 | 64.3 |
| Styrene-Butadiene rubber | 14.7 | 14.7 | 14.7 | 14.7 | 14.7 |
| Polybutadiene rubber | 21.0 | 21.0 | 21.0 | 21.0 | 21.0 |
| Zinc Oxide | 3.4 | 3.4 | 3.4 | 3.4 | 3.4 |
| Stearic acid | 1.9 | 1.9 | 1.9 | 1.9 | 1.9 |
| Polymerized 1,2-dihydroxy-2,2,4-trimethylquinoline | 1.0 | 1.0 | 1.0 | 1.0 | 1.0 |
| Petroleum hydrocarbon resin | 2.9 | 2.9 | 2.9 | 2.9 | 2.9 |
| Carbon black | 33.6 | 33.6 | 33.6 | 33.6 | 33.6 |
| Oil | 11.2 | 11.2 | 11.2 | 11.2 | 11.2 |
| N-t-butylbenzothiazole sulfonamide | 0.8 | 0.8 | 0.8 | 0.8 | 0.8 |
| Morpholinobenzothiazole | 0.6 | 0.6 | 0.6 | 0.6 | 0.6 |
| Sulfur | 2.8 | 2.8 | 2.8 | 2.8 | 2.8 |
| Methylene Acceptor (Resorcinol based compound) | 0 | 0 | 0 | 0 | 0 |
| Methylene Donor (Hexamethoxymelamine resin based compound) | 1.9 | 2.9 | 5.6 | 5.6 | 2.9 |
| Silica | 14.4 | 14.4 | 14.4 | — | 14.4 |
| Zinc processing aid (Aktiplast MS from RheinChemie) | — | — | — | — | 1.9 |
| N-Cyclohexylthiophthalimide | — | — | — | — | 0.24 |
| Bis(triethoxysilylpropyl)disulfide | — | — | — | — | 0.95 |

Comparative Examples

RFL-Treated Polyester Cords and Nylon Cords

In Comparative Example 1, a PET greige cord with no surface modification agent (or otherwise engineered surface) was subjected to a conventional two-step coating process by first treating the cord with an aqueous dip containing a blocked isocyanate/epoxy resin mixture followed by heat treatment and then the pre-treated cord was subsequently coated with an typical RFL adhesive dip formulation, followed by heat treatment. Adhesion of the resulting treated cord was then determined with a typical unmodified rubber compound as shown in Table 1. (This is Comparative Example 1 shown in Table 3).

In Comparative Example 2, the PET greige cord used was prepared from polyester fibers that were treated with a spinfinish and overfinish containing epoxy functionalities. This network forming epoxy finish system is described in U.S. Pat. No. 4,348,517. This greige cord, designated as PES-1, was further subjected to a conventional one-step RFL treatment (without any blocked isocyanate/epoxy pre-coating treatment). (This is Comparative Example 2 shown in Table 3)

For Comparative Example 3, a polyester cord with nylon and epoxy surface modification agents (designated as TES-1) was treated with a one-step RFL dip and adhesion was determined with an unmodified conventional rubber. The greige cord was obtained by injecting a nylon additive during the polyester fiber spinning process while using an epoxy containing spinfinish and overfinish. The cord used in this invention, for illustrative purpose, contained some Nylon. (This is Comparative Example 3 shown in Table 3)

For Comparative Example 4, a two-ply Nylon 6 cord was obtained from 1260 denier yarns and twisted to 9.5 times 9.5 turns per inch. Since it is a nylon cord, for comparative purpose, only its adhesion to an HRH rubber containing active rubber moieties was determined since nylon has been known to give good adhesion to HRH rubber in the Direct Bonding method. (This is Comparative Example 4 shown in Table 3).

TABLE 3

|  | Cord Type | RFL Treatment | Unmodified Control Rubber | | Modified Rubber HRH-1 | | Modified Rubber HRH-2 | |
| --- | --- | --- | --- | --- | --- | --- | --- | --- |
|  |  |  | Adhesion (lbs/in) | Visual Rating | Adhesion (lbs/in) | Visual Rating | Adhesion (lbs/in) | Visual Rating |
| Comp. Ex. 1 | PET | 2-step RFL | 30.2 | 4.0 | — | — | — | — |
| Comp. Ex. 2 | PES-1 | 1-step RFL | 34.0 | 4.2 | — | — | — | — |
| Comp. Ex. 3 | TES-1 | 1-step RFL | 40.5 | 4.4 | — | — | — | — |
| Comp. Ex. 4 | Nylon | None | — | — | 44.1 | 4.4 | 38.7 | 4.4 |
| Example 1 | PES-1 | None | 5.4 | 0 | 33.7 | 4.2 | 36.3 | 4.2 |
| Example 2 | PES-2 | None | 4.1 | 0 | 40.2 | 4.2 | 45.4 | 4.4 |
| Example 3 | TES-1 | None | 7.3 | 0 | 32.6 | 4.0 | 28.2 | 4.2 |

Examples 1–3

Direct Bonding of Polyester Cords with Epoxy and/or Nylon Engineered Surfaces to HRH Modified Rubber Compounds In Example 1, a cord-to-rubber reinforced composite was prepared with the same polyester cord as used in Comparative Example 2. This cord, designated as PES-1, has an epoxy surface modification agent, that was obtained during the fiber spinning process using an epoxy containing spinfinish and an epoxy containing overfinish. In this inventive example, the cord was not subjected to an RFL treatment, but was directly constructed with two different rubbers (HRH-1 and HRH-2) containing different levels of methylene donor and methylene acceptor. The adhesion results are shown in Table 3. It can clearly be seen that the inventive polyester cord with epoxy engineered surface can be directly bonded to rubber compounds containing methylene donor and methylene acceptor active rubber moieties without the use of an RFL coating or extra heat treatment. The adhesion data also compared favorably with the control samples in Comparative Examples 1 and 2, where a pre-coating step and RFL treatment are required to achieve a desirable level of cord to rubber adhesion.

In Example 2, another cord-to-rubber reinforced composite was prepared but with a polyester cord designated as PES-2, which has a higher level of epoxy surface modification agent than PES-1. Again, it can be seen from Table 3 that even without the conventional RFL treatment, the adhesion values are better than those of the RFL treated cords and are very comparable to that of nylon cord.

Example 3 showed that a polyester cord with nylon and epoxy surface modification agent (TES-1) can also be directly bonded to an HRH rubber with active rubber moieties without the need for an RFL treatment. The adhesion result is shown in Table 3.

The data in Examples 1–3 clearly illustrated that the polyester cords with specially tailored epoxy and/or nylon surface modification agents as described herein, can be directly bonded to rubber containing active rubber moieties, without the need for an RFL coating or additional heat treatment. The heat provided during rubber vulcanization was sufficient to cure the active rubber moieties in the HRH modified rubber compounds and provided good cord to rubber adhesion.

Example 4

Direct Bonding of Polyester Cords with Epoxy Surface Modification Agents to HRH Modified Rubber Compounds In this example, polyester cords that were designed to have different non-activated and adhesive activated spinfinish and/or overfinish were evaluated for adhesion with a rubber stock containing Activated Rubber Moieties. The surface activation of the polyester fibers were accomplished by using epoxy containing spinfinish and/or overfinish (denoted as Epoxy activated in Table 4) during the fiber spinning process. The surface activated polyester fibers were then twisted into cords and directly bonded to an HRH modified rubber for adhesion study. The conventional RFL treatment was omitted. The adhesion results are shown in Table 4.

TABLE 4

|  |  | Control Rubber | | | Modified Rubber: HRH-2 | | |
| --- | --- | --- | --- | --- | --- | --- | --- |
| Type of Spinfinish | Type of Overfinish | Sample | Adhesion (lbs/in) | Visual Rating | Sample | Adhesion (lbs/in) | Visual Rating |
| Non-activated | None | A | 6.2 | 0 | G | 6.5 | 0 |
| Non-activated | Epoxy Activated | B | 4.1 | 0 | H | 17.3 | 3.9 |
| Non-activated | Epoxy activated and catalyzed | C | 4.1 | 0 | I | 21.5 | 3.9 |
| Epoxy activated | None | D | 7.6 | 0 | J | 19.9 | 3.5 |
| Epoxy activated | Epoxy Activated | E | 5.4 | 0 | K | 33.5 | 4.0 |
| Epoxy activated | Epoxy activated and catalyzed | F | 4.1 | 0 | L | 38.4 | 4.0 |

By comparing samples G, H and I in Table 4, it can be seen that the adhesion of the polyester cords to HRH-2 rubber can be improved by activating the polyester fiber surface with an epoxy containing overfinish. Furthermore, when an epoxy activated spinfinish with and without an epoxy activated overfinish was applied to the surface of the polyester fibers, as in samples J, K and L of Table 4, significant improvement in adhesion can be achieved and the adhesion values are very comparable with those of the cords that were RFL treated as shown in Comparative Examples 1 and 2 of Table 3. The data demonstrated the ability of the inventors in tailoring and engineering the surface of the polyester fibers to achieve good direct bonding of polyester cords to rubber without the need of an RFL treatment process.

Example 5

Direct Bonding of Polyester Cords having Epoxy and Resorcinolic Surface Modification Agents to Modified Rubbers—Variation of Methylene Acceptor Content on Fiber Surface This example illustrates the achievement of good direct bonding of cord to rubber adhesion using polyester cords having both epoxy and resorcinolic surface modification agents. The rubber used to assess cord to rubber adhesion, contained only a methylene donor compound. The methylene acceptor compound is deposited onto the surface of the polyester fibers or cords to generate polyester fibers or cords with the desirable epoxy and resorcinolic surface modification agents that are described herein. The resorcinolic engineered surface was obtained by coating a PES-1 cord as used in Example 1 with an adhesive solution containing a methylene acceptor compound, which is in this case, a resorcinolic resin. In this example, the resorcinolic resin of choice was Penacolite Resin B19, commercially available from Indspec Inc. The adhesive solution was prepared by dissolving the specific required amount of the resorcinolic resin in acetone. For example, when a two-parts solution is needed, 2 grams of Penacolite Resin B19 was dissolved in 100 grams of acetone. Any low boiling, organic solvent that can dissolve the resorcinolic resin and provide fast drying during the coating process can be used.

The composition of the rubber formulation that was used in this example to evaluate adhesion is shown as rubber R-1 in Table 2. It should be noted that this rubber contained only a methylene donor (which is in this case, a resin containing hexamethoxymethylmelamine (HMMM), available from Solutia Inc. as Resimene 3520S72). PES-1 was coated with different solutions containing increasing levels of resorcinolic resin. The adhesion results as a function of increasing coating solution concentration or increasing coating pick up are reported in Table 5.

TABLE 5

| Parts by weight of Resorcinolic Resin[1] in coating solution[2] | Coating Pick Up[3] (weight percent based on cord weight) | Adhesion (lbs/in) | Visual Rating |
| --- | --- | --- | --- |
| 2 | 1.9 | 19.5 | 1.8 |
| 4 | 3.2 | 25.4 | 2.2 |
| 8 | 5.3 | 32.9 | 3.7 |
| 10 | 6.2 | 32.9 | 3.7 |
| 12 | 7.1 | 33.1 | 4.0 |
| 16 | 8.8 | 39.1 | 4.3 |
| 20 | 10.4 | 36.6 | 4.1 |

[1]Resorcinolic resin used is Penacolite Resin B19 from Indspec Inc.
[2]Coating solution was obtained by dissolving B19 resin in acetone. The numbers represent parts of resin by weight in 100 parts of acetone
[3]Coating Pick Up was estimated from Coating solution concentration versus Coating Pick Up study The data in Table 5 clearly demonstrated that, by having both epoxy and resorcinolic surface modification agents on the polyester cords, it is possible to achieve direct bonding between rubber and polyester cords without the need for an RFL treatment. Moreover, the need to incorporated both a methylene donor and methylene acceptor in the rubber was not necessary.

In addition, since the RFL process is not needed in this case, additional heat treatment was not required. Only the heat required to vulcanize the final rubber stock was sufficient to promote crosslinking of the methylene donor and methylene acceptor at the cord to rubber interface to impart good adhesion between the polyester cords and the rubber. It can also be seen from Table 5 that a 5 weight percent coating pick up gave an adhesion value of 32.9 lbs/ inch which is comparable to an adhesion of 34 lbs/inch for an corresponding RFL treated polyester cord as shown in Comparative Example 2.

Example 6

Direct Bonding of Polyester Cords having Epoxy and Resorcinolic Surface Modification Agents to Modified Rubbers—Variation of Methylene Donor Content in Rubber Stocks A polyester cord with both epoxy and resorcinolic surface modification agents was used for the adhesion study. The resorcinolic engineered surface was in this case, obtained from coating a polyester cord having an epoxy engineered surface with a solution containing 8 grams of the methylene acceptor resorcinolic compound (i.e. Penacolite Resin B19) in 100 grams of acetone. The adhesion results of this cord with rubber compounds containing different levels of methylene donor and silica but no methylene acceptor are shown in Table 6. The compositions of the rubber stocks used in this example are designated as rubbers R-2, R-3, R-4 and R-5 as shown in Table 2 above.

TABLE 6

| Rubber Compound | Methylene Donor[1] HMMM (phr) | Silica[2] (phr) | Coupling Agent[3] (phr) | Adhesion (lbs/in) | Visual Rating |
| --- | --- | --- | --- | --- | --- |
| R-2 | 2.9 | 14.4 | — | 38.7 | 4.3 |
| R-3 | 5.6 | 14.4 | — | 28.9 | 3.3 |
| R-4 | 5.6 | — | — | 16.6 | 2.0 |
| R-5 | 2.9 | 14.4 | 0.95 | 43.0 | 4.3 |

[1]Hexamethoxymethylmelamine (or HMMM) available as Resimene 3520S72 from Solutia Inc.
[2]HiSil 233 from PPG
[3]Bis(triethoxysilylpropyl)disulfide It can be seen from Table 6 that only minimum amount of the methylene donor (i.e. hexamethoxymethylmelamine) was needed to achieve the desirable cord to rubber adhesion. Higher levels of hexamethoxymethylmelamine in the rubber seemed to have an adverse effect on adhesion. Depending on the nature of the polyester engineered surfaces, desirable cord to rubber adhesion can be achieved with the appropriate design of the rubber formulations. The result with respect to rubber compound R-4 confirmed again the importance of silica in the HRH dry rubber bonding system. Rubber compound R-6 contains, in addition to the methylene donor, a disulfide organosilane derivative as a coupling agent. The high adhesion value with rubber formulation R-6, proved that with the appropriate design of the polyester engineered surface and the proper tailoring of the active rubber moieties in the rubber compounds, desirable polyester cord to rubber adhesion can be attained.

Thus, specific embodiments and applications of the production of tire fabrics, methods and uses thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A polyester-based reinforced rubber composition, comprising:
   a plurality of polyester-based fibers, wherein at least some of the fibers comprise a modification coat that includes a surface modification agent other than RFL, the surface modification agent comprising a methylene acceptor; and
   a rubber composition comprising a plurality of active rubber moieties that have a plurality of methylene donors and that are substantially free of methylene acceptors, wherein the rubber composition at least partially surrounds the at least some of the fibers, and wherein the surface modification agent of the modification coat forms covalent bonds with at least some of the plurality of active rubber moieties.

2. The rubber composition of claim 1, wherein the surface modification agent comprises a second methylene acceptor.

3. The rubber composition of claim 1, wherein the rubber composition consists essentially of non-metal moieties.

4. The rubber composition of claims 1 or 3, wherein the surface modification agent and active rubber moieties form a resin interface.

5. The rubber composition of one of claims 1, 2, or 3, wherein the surface modification agent comprises epoxy groups.

6. The rubber composition of claim 5, wherein the surface modification agent further comprises aromatic hydroxy compounds.

7. The rubber composition of claim 1, wherein the polyester-based fibers comprise up to about 10% nylon.

8. The rubber composition of claim 5, wherein the polyester-based fibers comprise up to about 10% nylon.

9. The rubber composition of claim 5, wherein the surface modification agent further comprises phenolic groups derived from resorcinol, resorcinol-formaldehyde resin, phenol-formaldehyde resin, polyhydric phenol, phenolic novolak resin, resorcinolic novolak resin, phenolic-resorcinolic novolak resin, polyhydric phenol novolak resin, meta-substituted alkenyl phenol or mixtures or derivatives of any of the foregoing.

10. The rubber composition of claim 5, wherein the surface modification agent further comprises hexamethoxymethylmelamine, partially or completely alkoxymethylated monomeric or oligomeric derivatives of melamine, melamine-formaldehyde resin, benzoguanamine, acetoguanamine, cyclohexylguanamine, glycoluril or mixtures or derivatives of any of the foregoing.

11. The rubber composition of claim 8, wherein the surface modification agent further comprises phenolic groups derived from resorcinol, resorcinol-formaldehyde resin, phenol-fomnidehyde resin, polyhydric phenol, phenolic novolak resin, resorcinolic novolak resin, phenolic-resorcinolic novolak resin, polyhydric phenol novolak resin, meta-substituted alkenyl phenol or mixtures or derivatives of any of the foregoing.

12. The rubber composition of claims 8, wherein the surface modification agent further comprises hexamethoxymethylmelamine, partially or completely alkoxymethylated monomeric or oligomeric derivatives of melamine, melamine-formaldehyde resin, benzoguanamine, acetoguanamine, cyclohexylguanamine, glycoluril or mixtures or derivatives of any of the foregoing.

13. The rubber composition of claim 5, wherein the plurality of active rubber moieties fltrther comprises phenolic groups derived from resorcinol, resorcinol-formaldehyde resin, phenol-formaldehyde resin, polyhydric phenol, phenolic novolak resin, resorcinolic novolak resin, phenolic-resorcinolic novolak resin, polyhydric phenol novolak resin, meta-substituted alkenyl phenol or mixtures or derivatives of any of the foregoing.

14. The rubber composition of claim 5, wherein the plurality of active rubber moieties comprises hexamethoxymethylmelamine, partially or completely alkoxymethylated monomeric or oligomeric derivatives of melamine, melamine-formaldehyde resin, benzoguanamine, acetoguanamine, cyclohexylguanamine, glycoluril, or mixtures or derivatives of any of the foregoing.

15. The rubber composition of claim 8, wherein the plurality of active rubber moieties further comprises phenolic groups derived from resorcinol, resorcinol-formaldehyde resin, phenol-formaldehyde resin, polyhydric phenol, phenolic novolak resin, resorcinolic novolak resin, phenolic-resorcinolic novolak resin, polyhydric phenol novolak resin, meta-substituted alkenyl phenol or mixtures or derivatives of any of the foregoing.

16. The rubber composition of claim 8, wherein the plurality of active rubber moieties comprises hexamethoxymethylmelamine, partially or completely alkoxymethylated monomeric or oligomeric derivatives of melamine, melamine-formaldehyde resin, benzoguanamine, acetoguanamine, cyclohexylguanamine, glycoluril, resorcinol, a resorcinol-formaldehyde resin or mixtures or derivatives of any of the foregoing.

17. The rubber composition of claim 1, wherein the surface modification agent further comprises a liquid rubber having a number average molecular weight less than about 10,000.

18. The rubber composition of one of claims 1, 2, or 3, wherein the surface modification agent comprises from about 0.1 to about 10 parts per weight relative to the fiber weight.

19. The rubber composition of claims one of claims 1, 2, or 3, wherein the amount of active rubber moieties in the uncured rubber comprises from about 0.1 to about 10 parts per hundred relative to the uncured rubber.

20. A method of producing a polyester-based reinforced rubber composition, comprising:
   providing a plurality of polyester-based fibers;
   providing a rubber compound or composition, wherein the rubber compound or composition comprises a plurality of active rubber moieties that include a plurality of methylene donors and that are substantially free of methylene acceptors;
   coupling a surface modification agent other than REL that comprises a methylene acceptor onto at least some of the plurality of polyester-based fibers to thereby form a modification coat on the at least some of the plurality of polyester-based fibers; and
   contacting the modification coat with at least some of the plurality of active rubber moieties under conditions that lead to covalent crosslinking between the surface modification agent and at least some of the plurality of active rubber moieties.

21. The method of claim 20, wherein the conditions comprise vulcanization.

22. The method of claim 20, wherein upto about 10% of the polyuter-based fibers further comprise nylon.

* * * * *